UNITED STATES PATENT OFFICE.

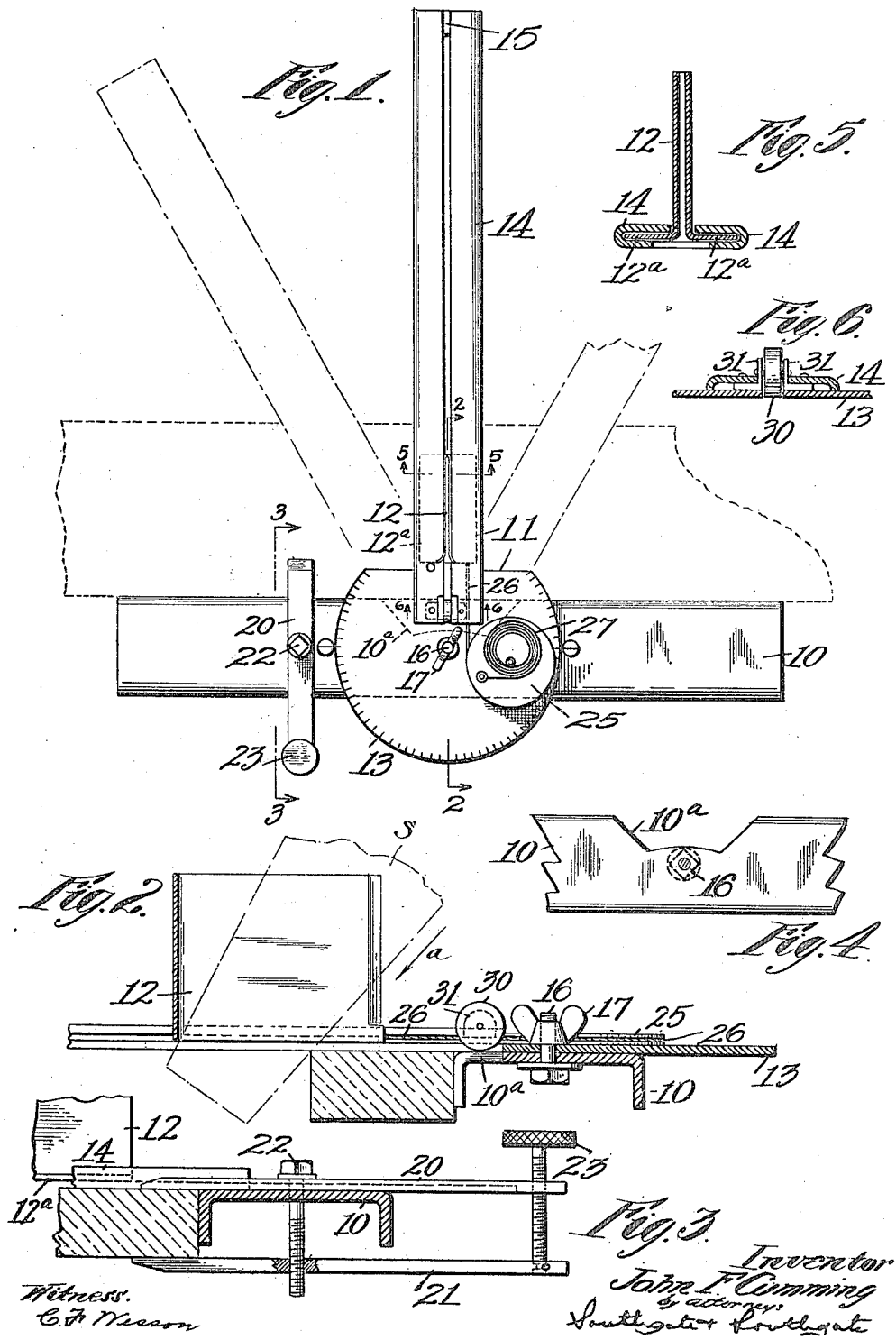

JOHN F. CUMMING, OF WORCESTER, MASSACHUSETTS.

SAW-GUIDE.

1,280,414.

Specification of Letters Patent.

Patented Oct. 1, 1918.

Application filed December 26, 1916. Serial No. 138,849.

*To all whom it may concern:*

Be it known that I, JOHN F. CUMMING, a citizen of the United States, residing at Worcester, in the county of Worcester and State of Massachusetts, have invented a new and useful Saw-Guide, of which the following is a specification.

This invention relates to a saw-guide which may be directly applied to the work, and by which a hand saw may be guided to produce a cut at any desired angle.

The only devices with which I am familiar, for accomplishing a similar result are the so-called "miter boxes", in which a special back saw is used, the saw being supported in substantially horizontal position. The boxes are heavy and costly, and are only adapted for work of comparatively light weight and narrow width, as it is extremely difficult to saw stock of any considerable width, with the saw held parallel to the wide face of the stock.

It is the object of my invention to provide a saw-guide which shall be portable and readily applied to stock of any size, and in the use of which the saw may be held at the angle customary in hand sawing. It is a further object of my invention to provide such a saw-guide, in which any common hand saw may be used.

With these general objects in view, one feature of my invention relates to the provision of a saw-guide having a head adapted to be secured to a piece of stock, and having a cross piece angularly adjustable on the head and adapted to guide the end of the hand saw at the desired angle to the stock.

In the preferred form I provide a slotted cross-piece upon which a block is slidably mounted, said block having provision for receiving the blade of a common hand saw, and being effective to guide the saw transversely of the stock. The block also holds the saw in a vertical position relatively to the surface of the stock. In using my saw-guide, the block is moved outwardly by the increasing width of the blade as the saw is pushed downward, provision being made for thereafter yieldingly returning the block and saw to their original lateral positions as the saw is drawn upward.

Further features of my invention relate to certain arrangements and combinations of parts which will be hereinafter described and more particularly pointed out in the appended claims.

A preferred form of my invention is shown in the drawings, in which,

Figure 1 is a plan view of my improved saw-guide;

Fig. 2 is a vertical sectional view taken along the line 2—2 in Fig. 1;

Fig. 3 is a sectional view on the line 3—3 in Fig. 1;

Fig. 4 is a detailed plan view of a portion of the saw-guide head, and

Figs. 5 and 6 are detailed sectional elevations taken along the lines 5—5 and 6—6 of Fig. 1, respectively.

Referring to the drawings, my improved saw-guide comprises a head 10, a cross-piece 11, and a sliding block 12. The head 10 is preferably made of sheet metal and is flanged along its opposite longitudinally edges, as clearly shown in Fig. 3. A portion of the head is cut away, as shown in Fig. 4, to permit angular adjustment of the cross-piece 11.

The cross-piece 11 comprises a graduated circular member 13 to which is secured a blade 14. The blade 14 is formed of two U-shaped members joined together at their outer ends by a filling strip 15, and secured at their inner ends to the graduated member 13. The cross-piece and head are secured in relative adjusted angular position by a bolt 16 and wing-nut 17, (Fig. 2).

It is sometimes desirable to secure the saw-guide to the work, and for this purpose a clamp is provided, comprising an upper member 20, secured to the head 10, and a lower member 21 (Fig. 3) supported by a screw 22, passing through the member 20 and the head 10. A second screw 23 is threaded in the end of the member 20, and engages the clamping member 21, forcing the inner end of said member upward to grip the stock. The lower end of the screw 23 may be rotatably secured to the member 21, to prevent displacement of the parts.

The sliding block 12, in the preferred form shown in the drawings, consists of a single piece of sheet metal, folded about its rear vertical edge and having its lower edges out-turned to form flanges 12$^a$, as shown in Fig. 5. The flanges 12$^a$ are slidable in horizontal slots or grooves formed in the blade 14 of the cross piece 11, and the upright portion of the block is slidable in a vertical slot formed between the members 14. The vertical sides of the block 12 are separated sufficiently to permit the insertion of the blade of a common hand saw, which is thus held in upright position and is guided at the angle at which the crosspiece is set.

A disk 25 is pivoted upon the graduated member 13, and is encircled by a cord or wire 26, having its outer end secured to the block 12. A spiral spring 27 has its inner end secured to the fixed stud upon which the disk rotates and its outer end secured to a pin in the disk 25. The spring thus places tension upon the cord 26, which tends to move the guide block 12 to the position shown in Fig. 1. The guide-block and saw are thus returned to original lateral position, after each operative stroke, as the saw is again drawn upward.

In order to protect the saw from engagement with any of the metal parts of the saw-guide, a roll 30 is mounted in brackets 31 (Fig. 6) positioned at the inner end of the slots in the blade 14. The roll 30 may be made of fiber or other suitable material, which will not injure the teeth of the saw. The head 10 is cut away at 10ª to provide additional clearance for the saw, when the cross-piece is set at an angle with the head.

Having thus described the details of my invention, the operation thereof will be apparent. The cross piece is set at any desired angle, by reference to the graduations upon the member 13, and secured in the desired position by the clamping nut 17. The head 10 is then placed against the edge of the stock, and may be secured in this position by the clamping members 20 and 21, if so desired. The end of the saw is then inserted between the sides of the block 12, and is pushed obliquely downward in the usual manner for making a cutting stroke. At the end of the cutting stroke the saw is drawn upward as usual and the saw and guiding block are yieldingly returned approximately to their original lateral positions. These operations are repeated until the stock is completely severed.

The raised position of the saw S is indicated in Fig. 2 and the direction of movement of the saw is shown by the arrow *a*.

When the device is not in use, the cross-piece 11 may be swung to the right until it is substantially alined with the head 10, in which position the entire device takes up but little space in a tool box or other receptacle.

As the device is light and easily handled and is applied directly to the work, it is not necessary to bring long or heavy timbers or other pieces of stock to any particular location before the device can be used thereon.

Having thus described my invention it will be evident that changes and modifications can be made therein by those skilled in the art, without departing from the spirit and scope of my invention as set forth in the claims, and I do not wish to be otherwise limited to the details herein disclosed, but what I claim is:—

1. A saw guide comprising a head, a cross piece angularly adjustable on said head, means to secure said head and cross piece in adjusted angular relation, a block slidable on said cross piece, said block having connected adjacent opposed surfaces and being effective to engage the back edge and adjacent side surfaces of a hand saw blade, and to move on said cross piece with said saw blade to guide said blade transversely of the work, and means to return said block approximately to its original lateral position when said saw is drawn upward.

2. A saw guide having a head, a cross piece adjustably secured to said head and having vertical and horizontal slots formed therein, a block having flanges slidable in said horizontal slots and having an upward extension slidable in said vertical slot, said extension being U-shaped in horizontal section with spaced portions adapted to receive a hand saw blade, said block being effective to guide the saw transversely of the work.

3. A saw guide comprising a head, a cross piece adjustably secured to said head, a block slidable on said cross piece and effective to loosely engage and position a hand saw blade, a spring-actuated disk mounted on said cross piece, and a flexible connection from said disk to said block, whereby said block is yieldingly returned to initial position after displacement therefrom by and with the saw on the operative stroke thereof.

In testimony whereof I have hereunto affixed my signature.

JOHN F. CUMMING.